Dec. 8, 1959  F. SALADRIGAS  2,915,827
TRANSIT
Filed Oct. 24, 1957  2 Sheets-Sheet 1
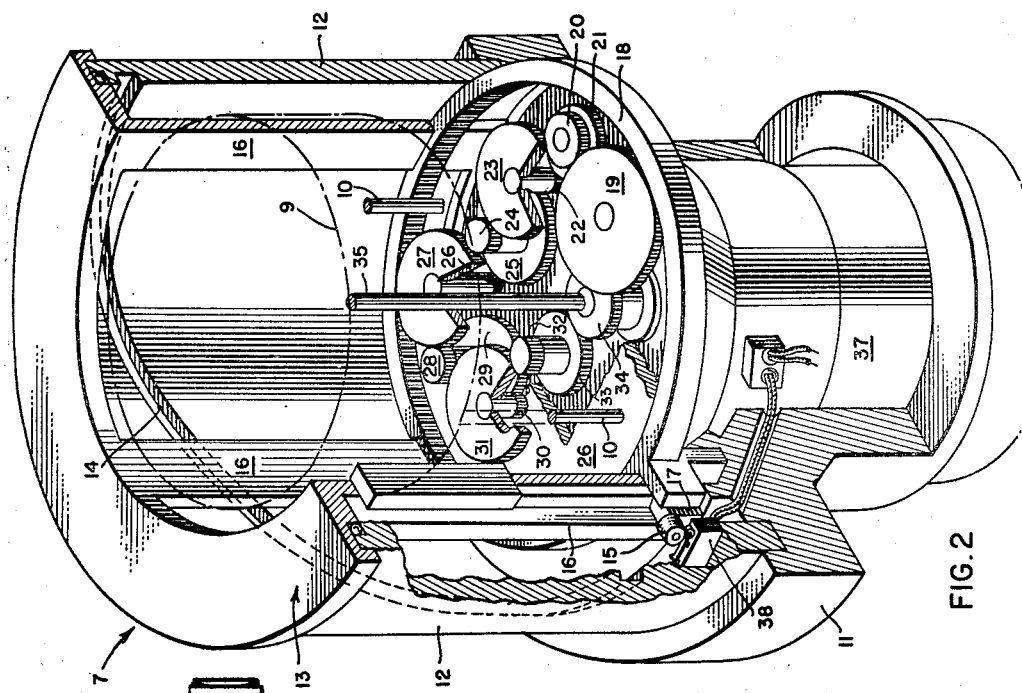
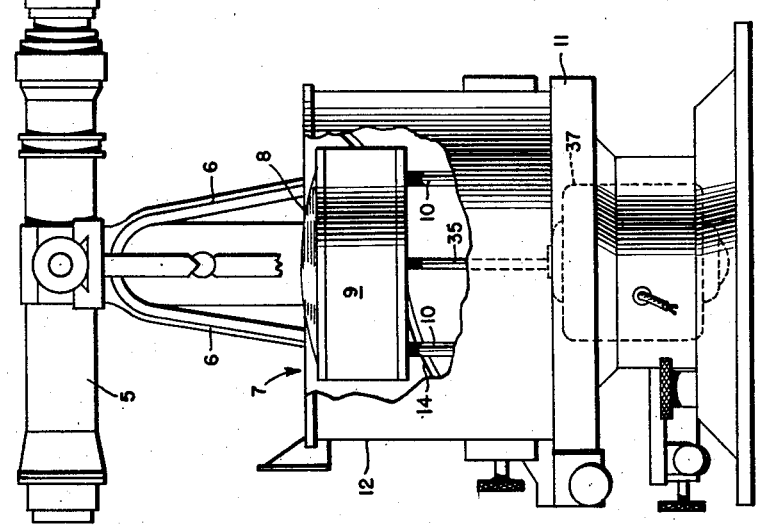
INVENTOR
Francisco Saladrigas
BY *Alvin Browdy*
ATTORNEY Dec. 8, 1959   F. SALADRIGAS   2,915,827
TRANSIT
Filed Oct. 24, 1957   2 Sheets-Sheet 2
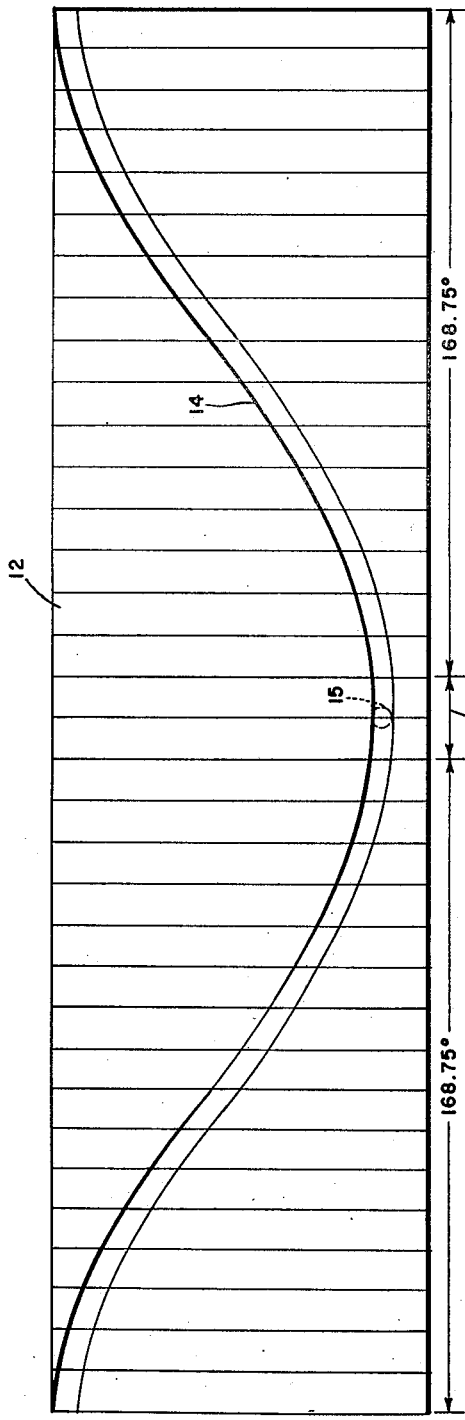
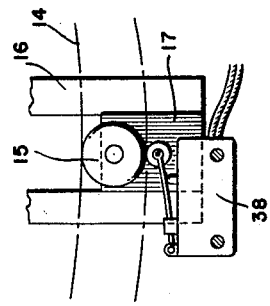
INVENTOR
Francisco Saladrigas
BY Alvin Browdy
ATTORNEY

United States Patent Office 2,915,827
Patented Dec. 8, 1959

2,915,827
TRANSIT

Francisco Saladrigas, Vedado, Havana, Cuba

Application October 24, 1957, Serial No. 692,149

19 Claims. (Cl. 33—72)

The present invention relates to a transit, and more particularly to a transit having a counter for indicating the arc traversed.

There are in wide spread use today many transits which are used to measure the angle between two lines. There is generally provided a tripod head which revolvably supports a lower plate, which is graduated. The alidade, which comprises the telescope, has an annular ring which carries a vernier, the zero of which may be called an indicator. In the normal usage of this transit, the line of collimation of the telescope is brought to coincide with the zero point of the graduations on the lower plate. Then the lower plate and the alidade are clamped together for common rotational movement. The telescope is then directed so that its axis of collimation is along one of the legs of the angle which is to be measured. When this has been done, the lower plate is clamped to the tripod head, this setting the zero point, and the alidade is unclamped from the lower plate. The alidade, together with the telescope, is then rotated until the line of collimation of the telescope lies along the second leg of the angle to be measured. The alidade is then reclamped to the lower plate and the reading made for the angle traversed by the telescope. It is usual to have a vernier associated with the zero mark of the alidade so that a fine reading may be made.

The above described construction and operation has been known for many years. The difficulty experienced in reading the angle indicated, the possibility of error, and the time consumed in reading the scales, have lead to attempts to improve the transit. Thus, other inventors have sought to provide some indicating means, such as one or more dials with needle pointers, connected for rotation with the telescope as the angle to be measured is traversed by the telescope. Others have sought to relay the angle traversed by the telescope by means of gears connected thereto. However, these prior art devices have had the drawback that for fine reading, the operator has had to combat the entire gear train during the traversal of the telescope. This is particularly disadvantageous when the operator approximately lines up the telescope with the target and turns the telescope horizontally a little to the left and a little to the right in order to reach the exact desired position. This is true because of the fact that the operator has the binding effect of the upper and lower plates of the instrument, plus any back lash present in the gear train to work against.

It is therefore an object of the present invention to provide a transit having a counter thereon so that the angle traversed may be read from a counter.

A further object of the present invention is the provision of a transit having a counter and in which the rotation of the telescope from one reference point to another is accomplished easily and with a minimum of frictional resistance.

Another object of the invention is to provide a transit wherein an angle indicating device is actuated subsequent to the traversal of a desired angle by the telescope.

Yet another object of the present invention is to provide a transit with a counter wherein any error in the instrument may be readily detected, and therefore compensated for.

Other objects and many of the attendant advantages of the invention will be readily understood by reference to the drawings wherein:

Fig. 1 is an elevational view, with parts removed, of an embodiment of the present invention, Fig. 2 is a perspective view of the invention with certain parts removed, and other parts in section, Fig. 3 is a development of the interior wall of a part of the invention, showing a cam groove, and Fig. 4 is a detail view of a switch used with the invention.

Referring now to the drawings, wherein like reference characters designate like parts throughout the several views, there is shown in Fig. 1 a telescope 5 pivotally supported on a plurality of legs 6 on an alidade top structure 7 having a magnifying window 8 positioned in an opening therein. Below magnifying window 8 is a counter unit 9 supported on legs 10.

In Fig. 2 there may be seen a base member comprising a lower plate 11 which is adapted to be secured to a tripod (not shown). Mounted in lower plate 11 for rotational movement therewith about a vertical axis is an alidade 12 of the alidade structure 7. A follower cage 13 is also supported for rotation by the lower plate 11. Alidade 12 has a cam groove 14 on the interior surface thereof, which rises from a lowermost point to an uppermost point, and then falls from the uppermost point back to the lowermost point. A cam follower roller 15 is supported for vertical movement in a slot in one of the posts 16 which is an integral part of the cage 13. A slide block 17 is slidably held in this slot of the post 16, and in turn supports the cam follower roller 15. It will be understood that there are four posts 16, of which three are shown in Fig. 2; the lower ends of the posts 16 are connected together by a ring 18 which is internally toothed. A gear 19 is in mesh with the teeth of the ring 18, and it is driven by a gear train composed of the gears 20 to 34, as shown. The gear 34 is mounted upon a shaft 35 which is driven by a motor 37, and which shaft 35 is the drive shaft, also, of the counter unit 9. The lower plate 11 has a shelf 26 integral therewith which supports the shafts for the gear train which drives the ring 18, and also supports the legs 10 for the counter 9.

A switch 38 for the motor 37 is located at the bottommost part of the groove 14.

As best seen in Fig. 3, groove 14 is so constructed that it is continuous, Fig. 3 being a development of the inner wall of the alidade 12. As will be understood, the groove 14 will cause a proportionate amount of rise or fall by the cam follower roller 15 for a proportionate number of degrees of rotation of alidade 12.

In Fig. 4 there is shown to enlarged scale a view of the cam follower roller 15 carried by the slide block 17, which is in turn received in the slot in post 16. The cam follower roller 15 is at the bottommost part of the cam groove 14, and is shown in contact with switch 38.

Although no clamps have been shown, it will be readily understood to those skilled in the art that the usual clamps are provided for clamping the various rotatable parts to each other and to the lower plate 11.

In operation, the device is mounted upon a tripod head in known manner, and adjusted thereto. In this initial position, the lower plate 11 and the alidade 12 are in a zero position with reference to each other, and the cage 13 and alidade 12 are also in a zero position with respect to each other, this being the position in which cam follower roller 15 is at the bottom-most part of cam groove 14. In this position the telescope 5 is directed towards a first reference object. Alidade 12 is then unclamped from lower plate 11, while the cage 13 remains clamped to the lower plate 11. The alidade 12, including telescope 5, is then rotated to a second reference object, it being understood that it is the angle between a line joining the vertical axis of the device and the first reference object and another line between the vertical axis of the device and the second reference object which is to be measured. The rotation of the alidade 12 will cause the cam follower roller 15 and the slide block 17 to rise upwardly in the slot of post 16, until an angle of 180° has been traversed, at which point the slide block will have reached its uppermost point. The vertical height through which the cam follower roller 15 and slide block 17 move is proportional to the angle traversed by the alidade 12. The only resistance to the rotation of the alidade 12 is the very slight rolling friction of the cam follower roller 15 in the cam groove 14 and the sliding of the slide block 17 in the slot of post 16. Once the telescope 5 has been sighted upon the second reference object, alidade 12 is clamped to lower plate 11, and cage 13 is unclamped from lower plate 11. The motor 37 is then energized, as by a switch, this causing the shaft 35 to rotate and drive the gear train which drives gear 19 and causes rotation of ring 18, and thus cage 13. In this instance, cage 13 is driven through the angle just traversed by the alidade 12 so that the slide block 17 and cam follower roller 15 descend in the slot post 16, cam follower 15 at all times traveling in the cam groove 14. When cam follower roller 15 reaches the bottom of cam groove 14, it contacts and opens switch 38 in the circuit of motor 37 as shown in Fig. 4, thus halting motor 37 and the rotation of cage 13.

While the cage 13 was being rotated by the motor 37, the counter unit 9 was also being driven by the motor 37, through shaft 35. The reading of counter 9 is readily observed through the window 8.

The gear ratio of the gear train between shafts 35 and ring 8 is preferably 21,600 to 1. Thus, it may be seen that 1 revolution of the shaft 35 causes the cage 13 to rotate through 1 second. Counter unit 9 is conventional in design and has individual dials for degrees, minutes and seconds.

It is readily possible to determine the amount of error existing in a particular device according to the present invention by the following procedure. The alidade 12 may be rotated, as before, through 360 degrees, and then the cage 13 is rotated as before. Any deviation of the counter unit 9 from a reading of 360 degrees (or zero) will be the amount of error present in 360 degrees. This error may then be used, proportionally, for any subsequent angular reading of the counter unit 9.

It should be understood that the method of rotating the cage through an angle corresponding to that of the alidade can be varied from that heretofore disclosed. For example, the motor 37 could be eliminated if desired, and a mechanical rotation imparted to the shaft 35. Likewise, the switch arrangement for stopping the motor 37 could be eliminated in favor of a discontinuous metallic conductor in the cam groove which completes a circuit when the cam roller engages the conductor and breaks the circuit at the discontinuous point which corresponds to the zero point.

It will of course be understood, also, that the present invention may be used in other types of similar instruments, such as any kind of goniometers; also, the angle measured with the present invention need not be only a horizontal angle, for the present invention may also be used for the measurements of vertical angles.

It will be obvious to those skilled in the art that various changes may be made without departing from the spirit of the invention and therefore the invention is not limited to what is shown in the drawings and described in the specification, but only as indicated in the appended claims.

I claim:

1. In a transit, a base member, an alidade mounted for rotational movement on said base member, a follower member mounted for independent rotational movement on said base member, means on said follower member for sensing the rotational movement of said alidade, a counter unit on said base member, and means to simultaneously drive said counter unit and said follower member, whereby when said follower member is reoriented with said alidade after rotation of said alidade, said counter unit will indicate the rotational movement of said alidade.

2. In a transit, a base member, an alidade mounted for rotational movement on said base member, a follower member mounted for independent rotational movement on said base member, means on said follower member to sense the angular position of said alidade with respect to said follower member, whereby said last mentioned means will sense displacement of said alidade from an initial position with respect to said follower member, and means to rotate said follower member to reorient said follower member with said alidade after rotation of said alidade, said reorientation being determined by said sensing means.

3. The apparatus of claim 2, and further comprising a counter unit, and means connected with said latter mentioned means to drive said counter unit.

4. The apparatus of claim 3 and further comprising means to sense the reorientation of said alidade and said follower member, and to stop said rotating means upon reorientation of said alidade and follower member.

5. The apparatus of claim 2, and further comprising means to sense the reorientation of said alidade and said follower member, and to stop said rotating means upon reorientation of said alidade and follower member.

6. In a transit, a base member, an alidade mounted for rotational movement on said base member, a follower member mounted for unlimited independent rotational movement on said base member concentric with said alidade, sensing means on said follower member having a first position corresponding to a first position of said alidade and follower member relative to each other, means on said alidade to cause said sensing means to move to other positions proportional to the angular displacement of said alidade from its said first position, means to rotate said follower member to the first position thereof relative to the alidade after rotation of said alidade from said first position, a counter unit and means to drive said counter unit simultaneously with and proportionately to said follower member.

7. The apparatus of claim 6 and means to sense the reattainment by said sensing means of said first position thereof.

8. In a transit, a base member, an alidade mounted for rotational movement on said base member, a follower member concentric with said alidade and mounted for rotational movement on said base member, a cam groove on said alidade, a cam follower on said follower member, said cam follower engaging in said cam groove, and means to rotate said follower member to return said cam follower to an initial position with respect to said cam groove after said alidade has been rotated from an initial position.

9. The aparatus of claim 8 and further comprising a counter unit, and means for driving said counter unit, said latter mentioned means being connected with said means to rotate said follower member.

10. In a transit, a base, an alidade member mounted for rotational movement on said base member, a follower member mounted for rotational movement on said base, a cam groove on one of said members, a slot on the other of said members, a cam follower supported in said slot for movement therein and cooperatively engaging said cam groove, whereby upon rotation of one of said members from an initial position with respect to the other of said members, said cam follower will be impelled by said cam groove to move in said slot, and means to rotate said follower member, whereby to reorient said members after initial displacement of said alidade member.

11. The apparatus of claim 10, and further comprising means to sense the reorientation of said members and to stop said rotating means upon reorientation of said members.

12. The apparatus of claim 11, wherein said rotating means comprises an electric motor and said sensing and stopping means comprises a switch.

13. The apparatus of claim 10 and further comprising a counter unit and means connected with said latter mentioned means to drive said counter unit.

14. In a transit, a base member, an alidade mounted for rotation on said base member, said alidade comprising a cylinder having a continuous cam groove in the interior wall thereof, a follower member mounted on said base member within said cylinder, a slot in said follower member generally parallel to the axis of said cylinder, a cam follower adapted to travel in said slot and operatively engaged in said cam groove, whereby rotation of said alidade from an initial position with respect to said follower member will cause said cam groove to cam said cam follower along said slot, and means to rotate said follower member, whereby to reestablish said alidade and said follower member in said initial position.

15. The apparatus of claim 14 and further comprising a counter unit, and means connected with said latter mentioned means for driving said counterunit.

16. The apparatus of claim 14 and further comprising means to sense the reestablishment of said initial position and to thereupon stop said rotating means.

17. The apparatus of claim 14, said follower member comprising toothed ring and said rotating means comprising a gear train having one gear thereof engaging the teeth of said ring.

18. The apparatus of claim 17, wherein said rotating means comprises an electric motor driving said gear train, and further comprising a switch positioned to be contacted by said cam follower when said initial position is reestablished, said switch being connected in circuit with said electric motor.

19. The apparatus of claim 18, further comprising a counter unit carried by said base, and means connecting said electric motor and counter unit in driving relationship.

References Cited in the file of this patent

UNITED STATES PATENTS

| | | |
|---|---|---|
| 1,167,247 | Anderson | Jan. 4, 1916 |
| 1,296,439 | Sperry | Mar. 4, 1919 |
| 1,432,309 | Thompson | Oct. 17, 1922 |